United States Patent
Kawaguchi (10) Patent No.: US 9,451,110 B2
(45) Date of Patent: Sep. 20, 2016

(54) IMAGE FORMING APPARATUS AND IMAGE FORMING METHOD

(71) Applicant: KYOCERA Document Solutions Inc., Osaka-shi, Osaka (JP)

(72) Inventor: Shinichi Kawaguchi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/949,688

(22) Filed: Nov. 23, 2015

(65) Prior Publication Data

US 2016/0150099 A1    May 26, 2016

(30) Foreign Application Priority Data

Nov. 25, 2014    (JP) .................. 2014-237795

(51) Int. Cl.
*H04N 1/00* (2006.01)
*H04N 1/40* (2006.01)

(52) U.S. Cl.
CPC ........ H04N 1/0071 (2013.01); H04N 1/00408 (2013.01); H04N 1/00771 (2013.01); H04N 1/00774 (2013.01); H04N 1/00809 (2013.01); H04N 1/00824 (2013.01); H04N 1/00925 (2013.01); *H04N 2201/0082* (2013.01); *H04N 2201/0094* (2013.01)

(58) Field of Classification Search
CPC ........... H04N 1/0071; H04N 1/00809; H04N 1/00408; H04N 1/00771; H04N 1/00774; H04N 1/00824; H04N 1/00925; H04N 2201/0082; H04N 2201/0094
See application file for complete search history.

(56) References Cited

U.S. PATENT DOCUMENTS

| | | | | |
|---|---|---|---|---|
| 5,974,233 A | * | 10/1999 | Nishiyama | G06K 15/00 358/1.13 |
| 7,869,103 B2 | * | 1/2011 | Ikeda | H04N 1/03 358/449 |
| 2013/0242355 A1 | * | 9/2013 | Morita | H04N 1/00734 358/449 |

FOREIGN PATENT DOCUMENTS

JP        2011172044 A        9/2011

* cited by examiner

*Primary Examiner* — Quang N Vo
(74) *Attorney, Agent, or Firm* — Alleman Hall McCoy Russell & Tuttle LLP (57) ABSTRACT

In an image forming apparatus, a notification processing portion is capable of suspending execution of a copy process by a process executing portion, and notifying a determination result of a size determining portion, in a case where an operation to execute the copy process has been performed and where the size determining portion has determined that documents having a size smaller than or equal to a size of a sheet on which a image forming portion can form an image, and having a width, in the document width direction, larger than a width, in the sheet width direction, in which the image forming portion can form an image, are placed on the document placement portion.

8 Claims, 5 Drawing Sheets

IMAGE FORMING APPARATUS AND IMAGE FORMING METHOD

INCORPORATION BY REFERENCE

This application is based upon and claims the benefit of priority from the corresponding Japanese Patent Application No. 2014-237795 filed on Nov. 25, 2014, the entire contents of which are incorporated herein by reference.

BACKGROUND

The present disclosure relates to an image forming apparatus and an image forming method which are capable of copying documents.

Generally, an image forming apparatus such as a copy machine has been known which is provided with: a document conveying portion such as an ADF that conveys documents placed on a document placement portion; an image reading portion capable of reading image data from the documents conveyed by the document conveying portion; and an image forming portion capable of forming, based on the image data, images on conveyed sheets. In this type of image forming apparatus, the documents are copied in accordance with an operation to execute a copy process for copying the documents placed on the document placement portion. There are cases where a width in which the image reading portion can read image data, in a direction perpendicular to a direction in which the document conveying portion conveys the documents, is larger than a width in which the image forming portion can form an image, in a direction perpendicular to a direction in which the sheets are conveyed. In such a configuration, a rotation process to rotate the image data read in the copy process by 90 degrees is executed, in a case where the size of the documents placed on the document placement portion is smaller than or equal to the size of the sheets in which the image forming portion can form an image, and the width of the documents placed on the document placement portion, in the direction perpendicular to the conveying direction in which the documents are conveyed by the document conveying portion, is larger than the width in which the image forming portion can form an image, in the direction perpendicular to the conveying direction of the sheets.

SUMMARY

An image forming apparatus according to an aspect of the present disclosure includes a document conveying portion, an image reading portion, a sheet conveying portion, an image forming portion, a process executing portion, a size determining portion, a rotation processing portion, and an notification processing portion. The document conveying portion conveys documents placed on a document placement portion. The image reading portion reads image data from the documents conveyed by the document conveying portion. The sheet conveying portion conveys sheets. The image forming portion is capable of forming images on the sheets conveyed by the sheet conveying portion on the basis of the image data. A width in which the image forming portion can form an image, in a sheet width direction perpendicular to a direction in which the sheets are conveyed by the sheet conveying portion, is smaller than a width in which the image reading portion can read an image, in a document width direction perpendicular to a direction in which the document conveying portion conveys the documents. The process executing portion executes a copy process of copying the documents placed on the document placement portion, in accordance with an operation to execute the copy process. The size determining portion determines a size and a direction of the documents placed on the document placement portion. The rotation process portion rotates the image data of the documents to be read in the copy process, in a case where the size determining portion has determined that documents having a size smaller than or equal to a size of a sheet on which the image forming portion can form an image, and having a width, in the document width direction, larger than a width, in the sheet width direction, in which the image forming portion can form an image, are placed on the document placement portion. The notification processing portion is capable of suspending execution of the copy process by the process executing portion, and notifying a determination result of the size determining portion, in a case where an operation to execute the copy process has been performed and where the size determining portion has determined that documents having a size smaller than or equal to a size of a sheet on which the image forming portion can form an image, and having a width, in the document width direction, larger than a width, in the sheet width direction, in which the image forming portion can form an image, are placed on the document placement portion.

An image forming method according to another aspect of the present disclosure is executed in an image forming apparatus including: a document conveying portion configured to convey documents placed on a document placement portion; an image reading portion configured to read image data from the documents conveyed by the document conveying portion; a sheet conveying portion configured to convey sheets; and an image forming portion capable of forming images on the sheets conveyed by the sheet conveying portion on the basis of the image data, such that a width in which the image forming portion can form an image, in a sheet width direction perpendicular to a direction in which the sheets are conveyed by the sheet conveying portion, being smaller than a width in which the image reading portion can read an image, in a document width direction perpendicular to a direction in which the document conveying portion conveys the documents. The method includes first to fourth steps as follows. In the first step, a copy process of copying the documents placed on the document placement portion is executed in accordance with an operation to execute the copy process. In the second step, a size and a direction of the documents placed on the document placement portion are determined. In the third step, the image data of the documents which are read in the copy process are rotated in a case where it has been determined in the second step that documents having a size smaller than or equal to a size of a sheet on which the image forming portion can form an image, and having a width, in the document width direction, larger than a width, in the sheet width direction, in which the image forming portion can form an image, are placed on the document placement portion. In the fourth step, execution of the copy process in the first step can be suspended and a determination result obtained in the second step can be notified, in a case where an operation to execute the copy process has been performed and where it has been determined in the second step that documents having a size smaller than or equal to a size of a sheet on which the image forming portion can form an image, and having a width, in the document width direction, larger than a width, in the sheet width direction, in which the image forming portion can form an image, are placed on the document placement portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings to enable understanding of the present disclosure. It should be noted that the following embodiments are examples embodying the present disclosure, and, by nature, do not limit the technical scope of the present disclosure.

[Schematic Configuration of Image Forming Apparatus 10]

Figure 1:
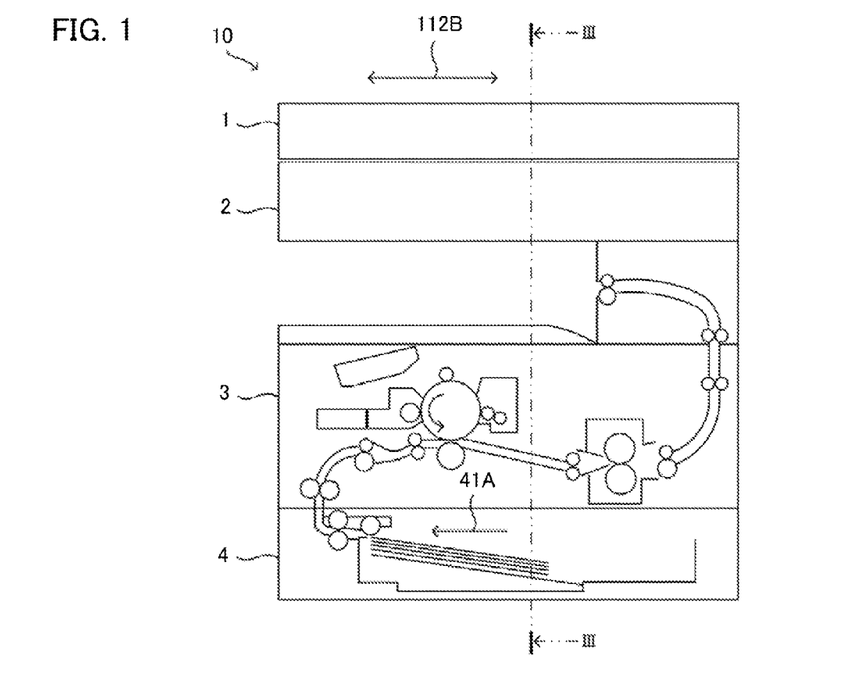
FIG. 1 shows a configuration of an image forming apparatus according to an embodiment of the present disclosure.

First, the schematic configuration of an image forming apparatus 10 according to an embodiment of the present disclosure will be described with reference to FIG. 1 and FIG. 2. FIG. 1 is a schematic cross-sectional view showing the configuration of the image forming apparatus 10.

Figure 2:
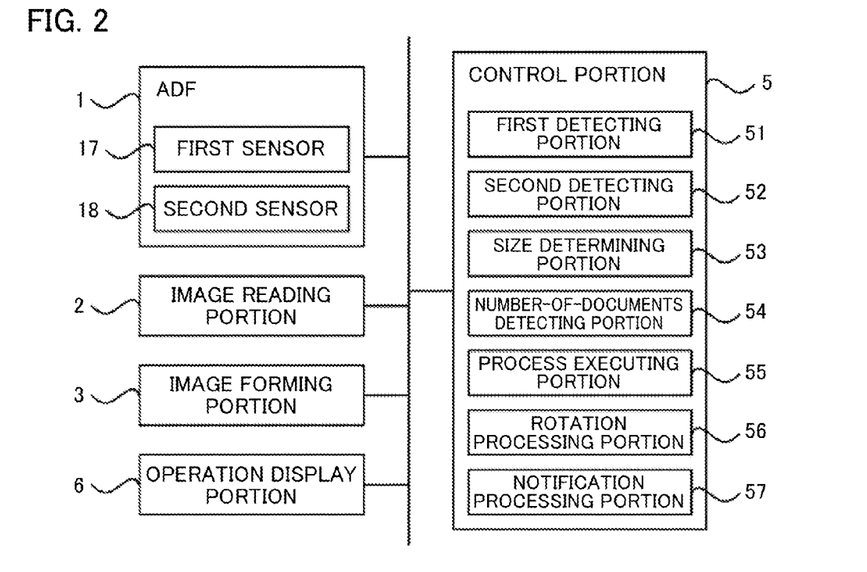
FIG. 2 is a block diagram showing a system configuration of the image forming apparatus according to the embodiment of the present disclosure.

As shown in FIG. 1 and FIG. 2, the image forming apparatus 10 includes an ADF 1, an image reading portion 2, an image forming portion 3, a sheet conveying portion 4, a control portion 5, and an operation display portion 6. The image forming apparatus 10 is a multifunction peripheral having, in addition to a scan function of reading image data from documents, a plurality of functions such as a print function, a facsimile function, or a copy function. The present disclosure is applicable to an image forming apparatus such as a copy machine.

Figure 3:
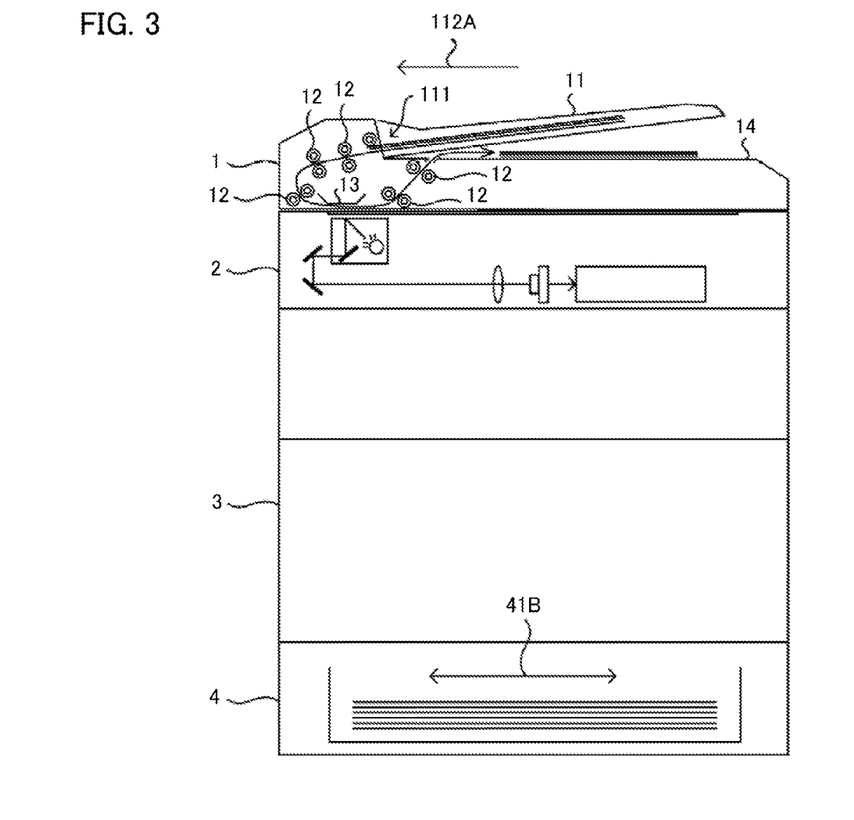
FIG. 3 shows a configuration of an ADF and an image reading portion of the image forming apparatus according to the embodiment of the present disclosure.

The image reading portion 2 includes a document table, a light source, a plurality of mirrors, an optical lens, and a charge coupled device (CCD) (refer to FIG. 3). The image reading portion 2 is able to execute an image reading process to read image data from a document placed on the document table or a document conveyed by the ADF 1.

The image forming portion 3 is able to form an image according to electrophotography, on the basis of the image data read by the image reading portion 2 or image data inputted from an external information processing device such as a personal computer. Specifically, the image forming portion 3 includes a photosensitive drum, a charging device, a laser scanning unit (LSU), a developing device, a transfer roller, a cleaning apparatus, a fixing roller, a pressure roller, and a sheet discharge tray. In the image forming portion 3, an image is formed on a sheet fed from the sheet conveying portion 4, and the sheet on which the image has been formed is discharged to the sheet discharge tray. The sheet is a sheet material such as paper, coated paper, a postcard, an envelope, an OHP sheet, and the like.

The sheet conveying portion 4 supplies the sheet to the image forming portion 3. Specifically, the sheet conveying portion 4 conveys sheets stored in a storage cassette, along a conveying direction 41A. For example, A4 size sheets are stored in the storage cassette. Each sheet conveyed by the sheet conveying portion 4 passes through an image forming position in the image forming portion 3 and then is discharged to the sheet discharge tray.

The control portion 5 includes control devices such as a CPU, a ROM, a RAM, and an EEPROM (registered trademark) which are not shown. The CPU is a processor which executes various calculation processes. The ROM is a non-volatile storage portion in which information such as a control program for causing the CPU to execute various processes is stored in advance. The RAM is a volatile storage portion, and the EEPROM is a non-volatile storage portion. The RAM and the EEPROM are used as temporary storage memories (working areas) for various processes executed by the CPU. The control portion 5 performs overall control of the image forming apparatus 10 by executing various control programs stored in advance in the ROM, with the CPU. The control portion 5 may be an electronic circuit such as an integrated circuit (ASIC). Alternatively, the control portion 5 may be a control portion provided separately from a main control portion that performs overall control of the image forming apparatus 10.

The operation display portion 6 includes: a display portion such as a liquid crystal display which displays various kinds of information in accordance with control instructions from the control portion 5; and an operation portion such as an operation key or a touch panel through which various kinds of information are inputted to the control portion 5 in accordance with operations performed by a user.

Figure 4:
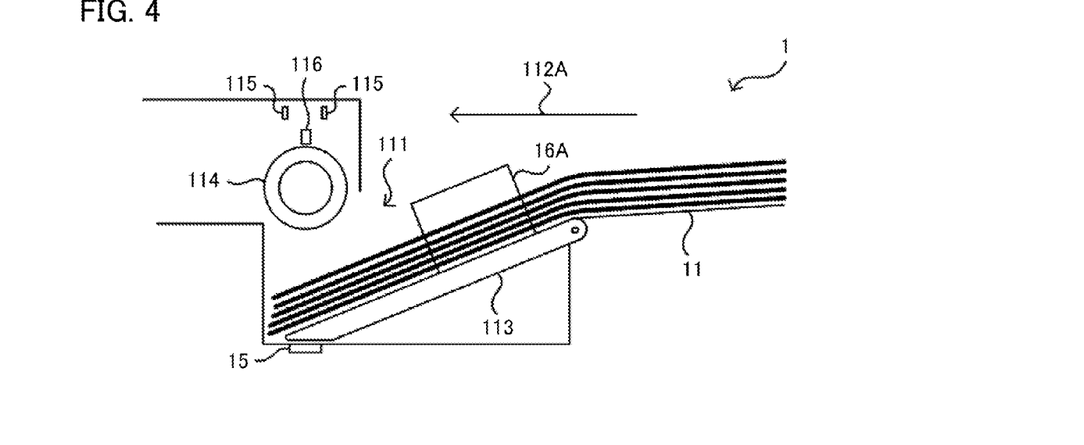
FIG. 4 shows the configuration of the ADF of the image forming apparatus according to the embodiment of the present disclosure.
Figure 5:
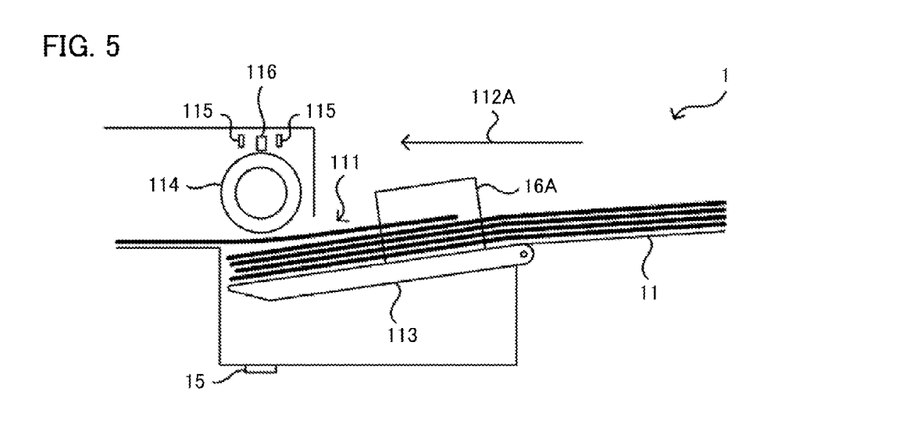
FIG. 5 shows the configuration of the ADF of the image forming apparatus according to the embodiment of the present disclosure.
Figure 6:
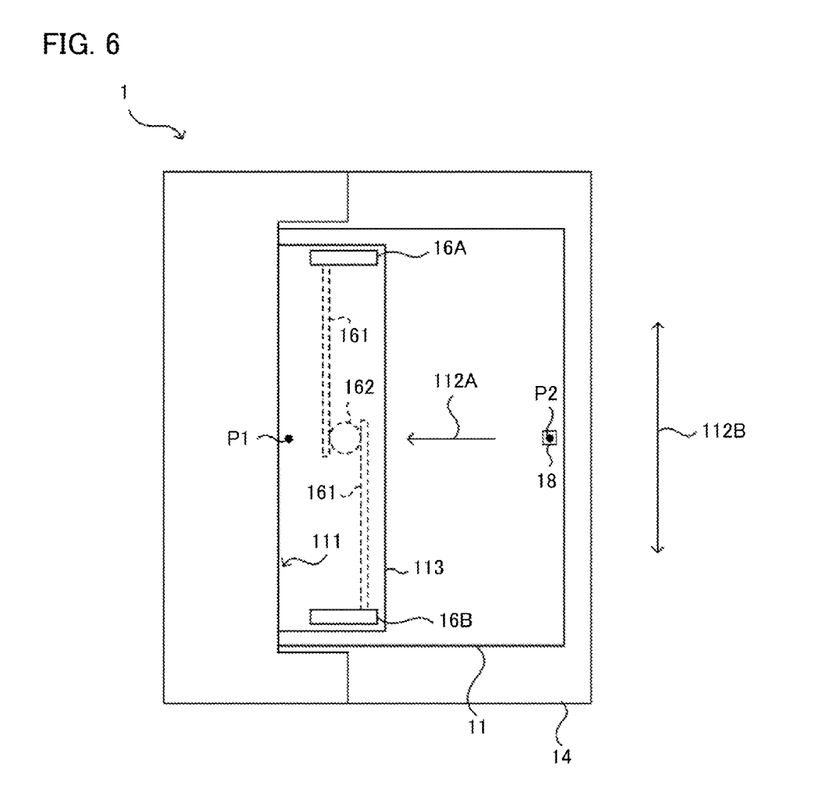
FIG. 6 shows the configuration of the ADF of the image forming apparatus according to the embodiment of the present disclosure.
Figure 7:
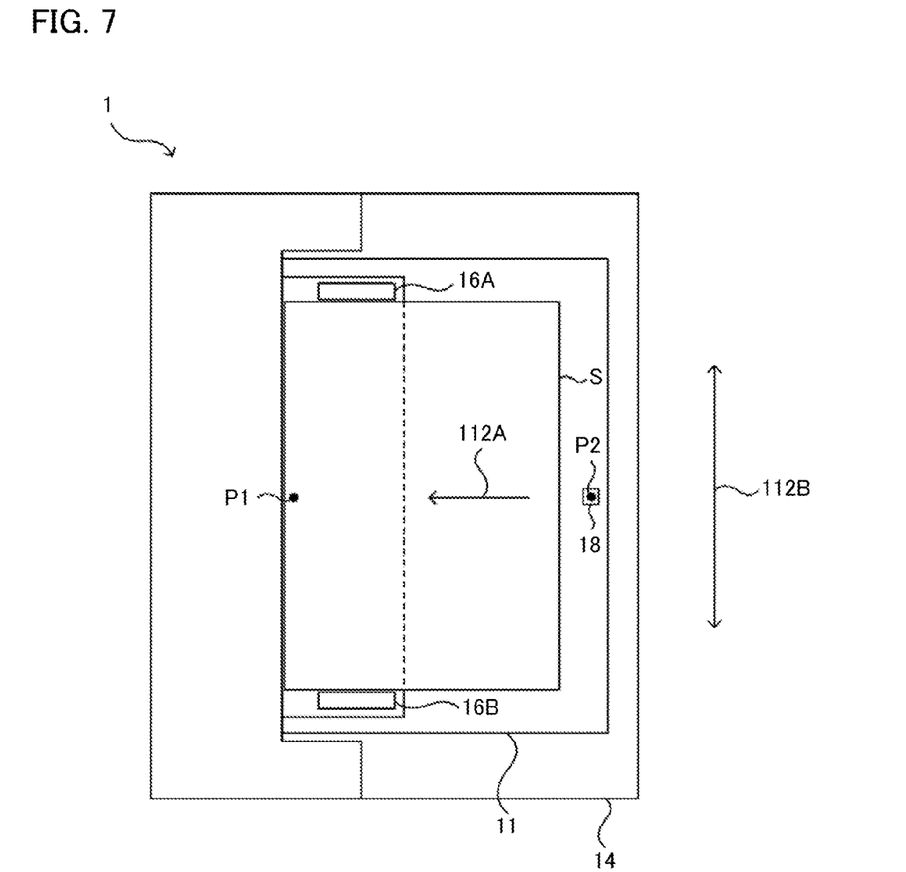
FIG. 7 shows the configuration of the ADF of the image forming apparatus according to the embodiment of the present disclosure.

Next, the ADF 1 will be described with reference to FIGS. 2 to 7. FIG. 3 is a sectional view as seen from the direction of arrows III-III in FIG. 1. FIG. 4 is a schematic cross-sectional view showing the configuration of a conveyance port 111 of a document placement portion 11. FIG. 5 shows the state where a lift member 113 shown in FIG. 4 rises. In FIGS. 4 and 5, solid lines indicate documents. FIG. 6 is a schematic plan view showing the configuration of the document placement portion 11. FIG. 7 shows the state where A4 size documents S are placed on the document placement portion 11.

The ADF 1 is an automatic document conveying apparatus which conveys documents to be read by the image reading portion 2. Specifically, the ADF 1 includes the document placement portion 11, a plurality of conveying rollers 12, a document sheet holder 13, a sheet discharge portion 14, a distance detecting sensor 15, guide members 16A and 16B, a first sensor 17, and a second sensor 18, as shown in FIGS. 2 to 4 and FIG. 6. The ADF 1 is an example of a document conveying portion according to the present disclosure.

The document placement portion 11 is a document placement table on which the documents to be read by the image reading portion 2 are placed. The documents placed on the document placement portion 11 are conveyed from the conveyance port 111 formed in a housing of the ADF 1 toward the sheet discharge portion 14.

Specifically, as shown in FIG. 4, the document placement portion 11 is tilted downward toward a conveying direction 112A, and a space where documents can be stacked is formed beneath the conveyance port 111. In addition, on the conveying direction 112A side of the document placement portion 11, the lift member 113 that lifts the placed documents up to the conveyance port 111 is provided. For example, as shown in FIGS. 4 and 5, an end of the lift member 113 which is opposite to the conveying direction 112A is supported with a shaft while the other end thereof is pivoted by a drive means such as a motor (not shown), whereby the lift member 113 can lift up the documents. Then, the documents lifted up by the lift member 113 are conveyed into the housing of the ADF 1 by a pickup roller 114 provided at the conveyance port 111.

In the ADF 1, the pickup roller 114 is disposed so that it can be pushed up, and a sensor 115 capable of detecting push-up of the pickup roller 114 is provided above the pickup roller 114. The drive means causes the lift member 113 to pivot until push-up of the pickup roller 114 by the documents being placed on the lift member 113 is detected by the sensor 115. For example, the sensor 115 is a transmission type optical sensor including a light-emitting portion and a light-receiving portion, and detects that an optical path is blocked by a blocking member 116 disposed so as to be movable in conjunction with push-up of the pickup roller 114.

The conveying rollers 12 are disposed on a document conveyance path inside the ADF 1. The conveying roller 12, being driven by a motor (not shown), causes each document fed from the conveyance port 111 to pass through the reading position for image data by the image reading portion 2 and then to be conveyed to the sheet discharge portion 14. The document sheet holder 13 presses the document sheet passing the reading position against the document table. Thereby, the image reading portion 2 is allowed to read the image data from the document conveyed by the ADF 1.

As shown in FIGS. 4 and 5, the distance detecting sensor 15 is disposed beneath the lift member 113, and detects a distance (height) in the vertical direction from the position where the distance detecting sensor 15 is disposed to a bottom surface of the lift member 113. For example, the distance detecting sensor 15 is a reflection type optical sensor having a light emitting portion and a light receiving portion. The distance detecting sensor 15 outputs, to the control portion 5, an electric signal according to the distance from the position where the distance detecting sensor 15 is disposed to the bottom surface of the lift member 113, in accordance with a control signal inputted from the control portion 5. Thereby, the control portion 5 is allowed to detect the distance from the position where the distance detecting sensor 15 is disposed to the bottom surface of the lift member 113, on the basis of the electric signal outputted from the distance detecting sensor 15.

The guide members 16A and 16B are disposed on the document placement portion 11 so as to be movable in a document width direction 112B perpendicular to the conveying direction 112A in which the documents are conveyed by the ADF 1, and regulates the position, in the document width direction 112B, of the documents placed on the document placement portion 11.

For example, as shown in FIG. 6, the guide members 16A and 16B are connected to a rack 161 and a pinion 162 provided inside the document placement portion 11, thereby to be synchronously movable toward or away from each other in the document width direction 112B. Thereby, a user is allowed to regulate the position, in the document width direction 112B, of the placed documents in accordance with a placement reference position P1 (refer to FIG. 6) on the document placement portion 11, by operating the guide members 16A and 16B. On the document placement portion 11, one of the guide members 16A and 16B may be movable in the document width direction 112B while the other may be fixed.

The first sensor 17 outputs an electric signal in accordance with the positions of the guide members 16A and 16B on the document placement portion 11, i.e., a separation distance between the guide members 16A and 16B. For example, the first sensor 17 is an electronic circuit including a variable resistor, the resistance value of which is varied in accordance with movement of the rack 161 in the document width direction 112B or rotation of the pinion 162. The first sensor 17 outputs, to the control portion 5, an electric signal of a voltage or a current according to the resistance value of the variable resistor, in accordance with the control signal inputted from the control portion 5. Thereby, the control portion 5 is allowed to detect the separation distance between the guide members 16A and 16B in the document width direction 112B, on the basis of the electric signal outputted from the first sensor 17.

The second sensor 18 outputs an electric signal in accordance with presence/absence of documents at a predetermined determination position P2 (refer to FIG. 6) on the document placement portion 11. Specifically, as shown in FIG. 7, the determination position P2 in the image forming apparatus 10 is a position included in a region outside an A4 size document S which is placed on the document placement portion 11 so that the center thereof in the longitudinal direction is aligned with the placement reference position P1. For example, the second sensor 18 is a reflection type optical sensor disposed on the determination position P2 and having a light emitting portion and a light receiving portion. The second sensor 18 outputs, to the control portion 5, an electric signal according to presence/absence of documents at the determination position P2, on the basis of a control signal inputted from the control portion 5. Thereby, the control portion 5 is able to detect presence/absence of documents at the determination position P2 on the document placement portion 11, on the basis of the electric signal outputted from the second sensor 18.

By the way, the image forming apparatus 10 is able to execute a copy process to copy the documents placed on the document placement portion 11 of the ADF 1. Specifically, the control portion 5 executes the copy process by controlling the ADF 1, the image reading portion 2, the image forming portion 3, and the sheet conveying portion 4, when an operation to execute the copy process is performed on the operation display portion 6.

In addition, in the image forming apparatus 10, the width, in the document width direction 112B, in which the image reading portion 2 can read image data is larger than the width, in a sheet width direction 41B (refer to FIG. 3) perpendicular to the conveying direction 41A in which the sheets are conveyed by the sheet conveying portion 4, in which the image forming portion 3 can form an image.

Specifically, in the image forming apparatus 10, the image reading portion 2 can read image data from a document placed on the document placement portion 11 and having a width, in the document width direction 112B, smaller than or equal to a predetermined first width, while the image forming portion 3 can form an image on a sheet having a width, in the sheet width direction 41B, smaller than or equal to a second width smaller than the first width. For example, the first width is a width of an A4 size in its longitudinal direction, and the second width is a width of the A4 size in its lateral direction.

In the image forming apparatus having the above-mentioned configuration, when the size of a document placed on the document placement portion 11 is smaller than or equal to the size of a sheet on which the image forming portion 3 can form an image and the width, in the document width direction 112B, of the document placed on the document placement portion 11 is larger than the width, in the sheet width direction 41B, in which the image forming portion 3 can form an image, it is necessary to execute a rotation process to rotate, by 90 degrees, the image data of the document to be read in the copy process. However, when the rotation process is executed in the copy process, start of image formation on the sheet is delayed due to the rotation process. On the other hand, in the image forming apparatus 10, such delay of the start of the image formation due to the execution of the rotation process in the copy process is suppressed as described below.

Specifically, in the ROM or the EEPROM of the control portion 5, a copy control program for causing the CPU to execute a later-described copy control process (refer to FIG. 8) has been stored in advance. The copy control program is stored in a non-transitory computer readable storage medium such as a CD, a DVD, or a flash memory, and may be read from the storage medium and installed in a storage portion such as the EEPROM of the control portion 5.

As shown in FIG. 2, the control portion 5 includes a first detecting portion 51, a second detecting portion 52, a size determining portion 53, a number-of-documents detecting portion 54, a process executing portion 55, a rotation processing portion 56, and a notification processing portion 57. The control portion 5, by using the CPU, executes the copy control program stored in the ROM, thereby functioning as the first detecting portion 51, the second detecting portion 52, the size determining portion 53, the number-of-documents detecting portion 54, the process executing portion 55, the rotation processing portion 56, and the notification processing portion 57.

The first detecting portion 51 detects the width, in the document width direction 112B, of the documents placed on the document placement portion 11. Specifically, the first detecting portion 51 transmits a control signal to the first sensor 17 to cause the first sensor 17 to output an electric signal according to the separation distance between the guide members 16A and 16B. Then, the first detecting portion 51 detects the width, in the document width direction 112B, of the documents placed on the document placement portion 11, on the basis of the electric signal outputted from the first sensor 17.

The second detecting portion 52 detects presence/absence of documents at the determination position P2 on the document placement portion 11. Specifically, the second detecting portion 52 transmits a control signal to the second sensor 18 to cause the second sensor 18 to output an electric signal according to presence/absence of documents at the determination position P2. Then, the second detecting portion 52 detects presence/absence of documents at the determination position P2 on the basis of the electric signal outputted from the second sensor 18.

The size determining portion 53 determines the size and direction of the documents placed on the document placement portion 11, on the basis of the detection result of the first detecting portion 51 and the detection result of the second detecting portion 52. Specifically, on the basis of the width, in the document width direction 112B, of the documents placed on the document placement portion 11, which width has been detected by the first detecting portion 51, the size determining portion 53 specifies a size having a length in the longitudinal direction or the lateral direction equal to the width. For example, it is conceivable that the width of the documents in the document width direction 112B, which width has been detected by the first detecting portion 51, is equal to the length of an A4 size in its longitudinal direction and the length of an A3 size in its lateral direction.

Then, the size determining portion 53 specifies the size and direction of the documents placed on the document placement portion 11, on the basis of the detection result of the second detecting portion 52. For example, when presence of documents at the determination position P2 has been detected by the second detecting portion 52, the size determining portion 53 determines that the documents placed on the document placement portion 11 are A3 size documents which are placed such that the lateral direction thereof is parallel to the document width direction 112B. Further, when absence of documents at the determination position P2 has been detected by the second detecting portion 52, the size determining portion 53 determines that the documents placed on the document placement portion 11 are A4 size documents which are placed such that the longitudinal direction thereof is parallel to the document width direction 112B.

The number-of-documents detecting portion 54 detects the number of the documents placed on the document placement portion 11. Specifically, the number-of-documents detecting portion 54 transmits a control signal to the distance detecting sensor 15, and causes the distance detecting sensor 15 to output an electric signal according to the distance from the position where the distance detecting sensor 15 is disposed to the bottom surface of the lift member 113. Then, the number-of-documents detecting portion 54 detects the distance from the position where the distance detecting sensor 15 is disposed to the bottom surface of the lift member 113, on the basis of the electric signal outputted from the distance detecting sensor 15. Thereafter, the number-of-documents detecting portion 54 detects, on the basis of the detected distance, the number of the documents with reference to table data indicating the correspondence relationship between the distance and the number of documents stored in the storage portion such as the EEPROM in advance. The method of detecting the number of the documents placed on the document placement portion 11 is not limited to the above method, and other known methods may be adopted.

The process executing portion 55 executes the copy process on the basis of an operation to execute the copy process.

The rotation processing portion 56 rotates the image data of the documents to be read in the copy process, in the case where the size determining portion 53 has determined that documents having a size smaller than or equal to the size of a sheet on which the image forming portion 3 can form an image and having a width, in the document width direction 112B, larger than the width, in the sheet width direction 41B, in which the image forming portion 3 can form an image, are placed on the document placement portion 11. For example, the rotation processing portion 56 rotates the image data of the documents to be read in the copy process, in the case where the size determining portion 53 has determined that the documents placed on the document placement portion 11 are A4 size documents which are placed such that the longitudinal direction thereof is parallel to the document width direction 112B.

The notification processing portion 57 is able to suspend execution of the copy process by the process executing portion 55 and notify the determination result of the size determining portion 53, in the case where an operation to execute the copy process has been performed and where the size determining portion 53 has determined that documents having a size smaller than or equal to the size of a sheet on which the image forming portion 3 can form an image and having a width, in the document width direction 112B, larger than the width, in the sheet width direction 41B, in which the image forming portion 3 can form an image, are placed on the document placement portion 11. For example, the notification processing portion 57 performs notification by causing the operation display portion 6 to display, as well as the determination result, a message that urges the user to change the direction of the documents placed on the document placement portion 11.

The notification processing portion 57 executes neither the copy process suspending process nor the determination result notifying process, in the case where the number of prints in the copy process exceeds a predetermined first reference value. In addition, the notification processing portion 57 executes neither the copy process suspending process nor the determination result notifying process, in the case where the number of documents detected by the number-of-documents detecting portion 54 exceeds a predetermined second reference value. That is, the notification processing portion 57 executes the copy process suspending process and the determination result notifying process, in the case where the number of prints in the copy process is smaller than or equal to the first reference value and the number of documents detected by the number-of-documents detecting portion 54 is smaller than or equal to the second reference value.

The first reference value and the second reference value may be set to appropriate values by the user. A configuration is also conceivable in which the notification processing portion 57 executes the copy process suspending process and the determination result notifying process regardless of one or both of the number of prints in the copy process and the number of documents detected by the number-of-documents detecting portion 54.

On the other hand, in the case where the copy process suspending process has been executed by the notification processing portion 57, the process executing portion 55 executes the copy process when an operation to execute the copy process is again performed after the notification of the determination result by the notification processing portion 57. It is also conceivable that the process executing portion 55 executes the copy process when a predetermined waiting time has passed from the notification of the determination result by the notification processing portion 57.

[Copy Control Process]

Figure 8:
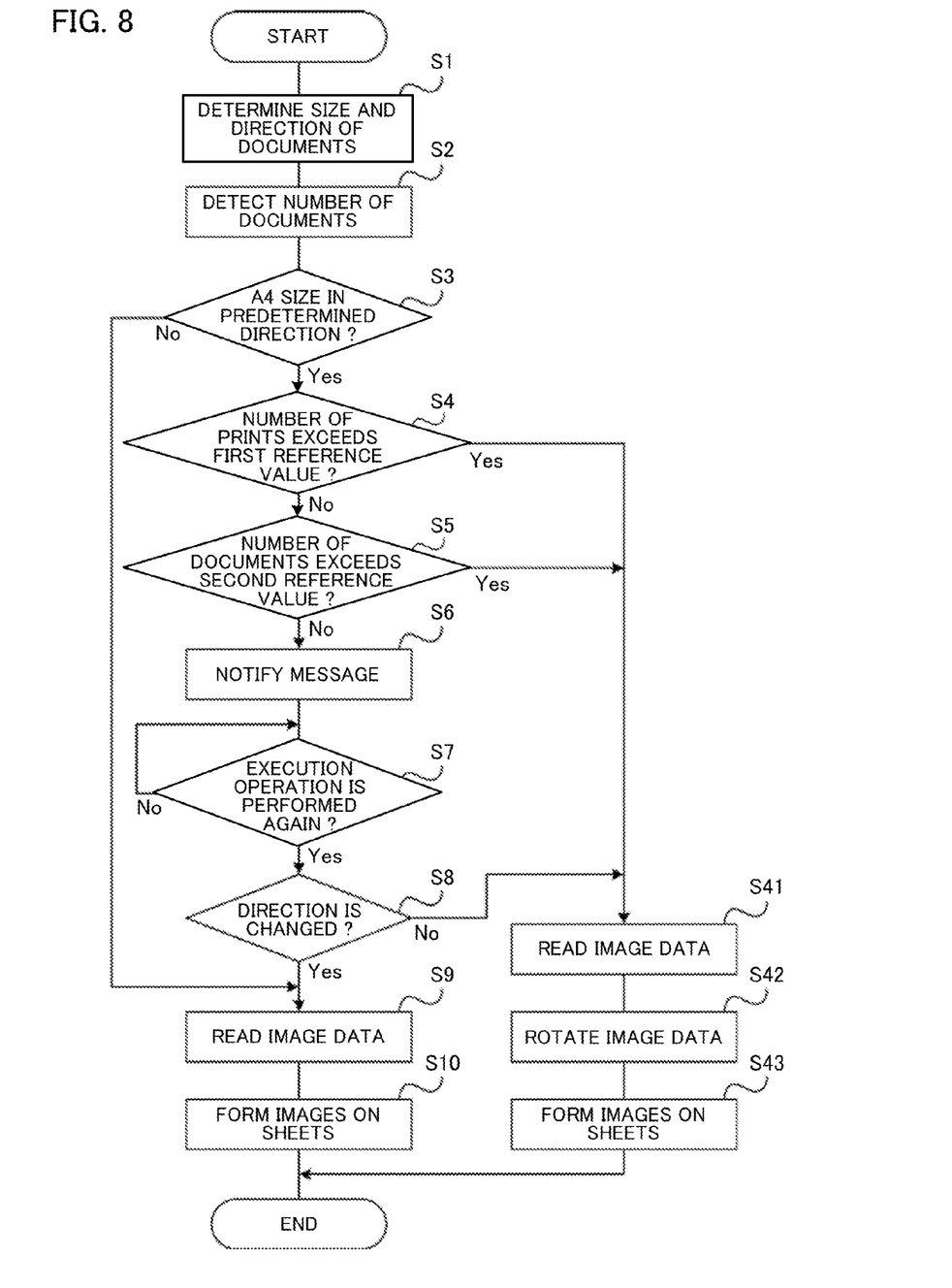
FIG. 8 is a flowchart showing an example of a copy control process executed by the image forming apparatus according to the embodiment of the present disclosure.

Hereinafter, an example of a procedure of a copy control process executed by the control portion 5 in accordance with the copy control program in the image forming apparatus 10 will be described with reference to FIG. 8. In FIG. 8, steps S1, S2, . . . indicate numbers of processing steps executed by the control portion 5. The control portion 5 executes the copy control process when an operation to execute the copy process is performed to the operation display portion 6.

<Step S1>

First, in step S1, the control portion 5 determines the size and direction of the documents placed on the document placement portion 11. Specifically, the control portion 5 detects the width, in the document width direction 112B, of the documents placed on the document placement portion 11, on the basis of the electric signal outputted from the first sensor 17. Further, the control portion 5 detects presence/absence of the documents at the determination position P2, on the basis of the electric signal outputted from the second sensor 18. Then, the control portion 5 determines the size and direction of the documents placed on the document placement portion 11, on the basis of the detection results of the width in the document width direction 112B and the presence/absence of the documents at the determination position P2. The process in step S1 is an example of a second step of the present disclosure, and is executed by the first detecting portion 51, the second detecting portion 52, and the size determining portion 53 of the control portion 5.

<Step S2>

In step S2, the control portion 5 detects the number of the documents placed on the document placement portion 11. Specifically, the control portion 5 detects the distance from the position where the distance detecting sensor 15 is disposed to the bottom surface of the lift member 113, on the basis of the electric signal outputted from the distance detecting sensor 15. Then, the control portion 5 detects the number of the documents placed on the document placement portion 11, on the basis of the detected distance. The process in step S2 is executed by the number-of-documents detecting portion 54 of the control portion 5.

<Step S3>

In step S3, the control portion 5 determines whether or not it has been determined in step S1 that documents having a size smaller than or equal to the size of a sheet on which the image forming portion 3 can form an image and having a width, in the document width direction 112B, larger than the width, in the sheet width direction 41B, in which the image forming portion 3 can form an image, are placed on the document placement portion 11. For example, the control portion 5 determines whether or not it has been determined that the documents placed on the document placement portion 11 are A4 size documents which are placed such that the longitudinal direction thereof is parallel to the document width direction 112B.

Assuming that the control portion 5 determines that it has been determined in step S1 that the documents placed on the document placement portion 11 are A4 size documents placed such that the longitudinal direction thereof is parallel to the document width direction 112B (Yes in S3), the control portion 5 shifts the process to step S4. When it has not been determined in step S1 that the documents placed on the document placement portion 11 are A4 size documents placed such that the longitudinal direction thereof is parallel to the document width direction 112B (No in S3), the control portion 5 shifts the process to step S9.

<Step S4>

In step S4, the control portion 5 determines whether or not the number of prints in the copy process exceeds the first reference value.

Upon determining that the number of prints in the copy process exceeds the first reference value (Yes in S4), the control portion 5 shifts the process to step S41. When the number of prints in the copy process is smaller than or equal to the first reference value (No in S4), the control portion 5 shifts the process to step S5.

<Step S5>

In step S5, the control portion 5 determines whether or not the number of the documents detected in step S2 exceeds the second reference value.

Upon determining that the number of the documents detected in step S2 exceeds the second reference value (Yes in S5), the control portion 5 shifts the process to step S41. When the number of the documents detected in step S2 is smaller than or equal to the second reference value (No in S5), the control portion 5 sits the process to step S6.

<Step S6>

In step S6, the control portion 5 suspends execution of the copy process, and notifies the determination result obtained in step S1. Specifically, the control portion 5 performs notification by causing the operation display portion 6 to display the determination result and a message that urges the user to change the direction of the documents placed on the document placement portion 11. The processes in step S3 and step S6 are an example of a fourth step of the present disclosure, and are executed by the notification processing portion 57 of the control portion 5.

<Step S7>

In step S7, the control portion 5 determines whether or not an operation to execute the copy process has been performed again.

Upon determining that an operation to execute the copy process has been performed again (Yes in S7), the control portion 5 shifts the process to step S8. When an operation to execute the copy process is not performed again (No in S7), the control portion 5, in step S7, waits for an operation to execute the copy process again.

<Step S8>

In step S8, the control portion 5 determines whether or not the direction of the documents placed on the document placement portion 11 has been changed from the direction determined in step S1. Specifically, the control portion 5 determines whether or not the direction of the documents placed on the document placement portion 11 has been changed, on the basis of the electric signal outputted from the second sensor 18.

Upon determining that the direction of the documents placed on the document placement portion 11 has been changed from the direction determined in step S1 (Yes in S8), the control portion 5 shifts the process to step S9. When the direction of the documents placed on the document placement portion 11 is not changed from the direction determined in step S1 (No in S8), the control portion 5 shifts the process to step S41.

<Step S9>

In step S9, the control portion 5 controls the ADF 1 and the image reading portion 2 to read the image data from the documents placed on the document placement portion 11.

<Step S10>

In step S10, the control portion 5 controls the image forming portion 3 and the sheet conveying portion 4 to form images on sheets on the basis of the image data read in step S9. The processes in step S9 and step S10 are an example of a first step of the present disclosure, and are executed by the process executing portion 55 of the control portion 5.

<Step S41>

On the other hand, when, for example, it has been determined in step S4 that the number of prints in the copy process exceeds the first reference value, the control portion 5 executes a process in step S41. In step S41, the control portion 5 controls the ADF 1 and the image reading portion 2 to read the image data from the documents placed on the document placement portion 11.

<Step S42>

In step S42, the control portion 5 rotates the image data read in step S41 by 90 degrees. The process in step S42 is an example of a third step of the present disclosure, and is executed by the rotation processing portion 56 of the control portion 5. Thus, each document is prevented from being copied with a part of the image thereof being missed.

The process in step S42 is executed after reading of image data of each page of the documents has ended. Therefore, in the case where the copy process is executed in the state where A4 size documents are placed on the document placement portion 11 such that the longitudinal direction thereof is parallel to the document width direction 112B, start of image formation on sheets is delayed due to the intervening image data rotation process. However, on the other hand, reading of document images is ended earlier as compared to the case where the copy process is executed in the state where A4 size documents are placed on the document placement portion 11 such that the longitudinal direction thereof is perpendicular to the document width direction 112B.

Therefore, in the copy control process, when the number of prints in the copy process exceeds the first reference value, the control portion 5 performs neither the copy process suspending process nor the determination result notifying process. Thus, for example, when the number of prints is great and therefore the printing process continues for a long period of time after reading of document images has ended, it is possible to meet the demand of a user who wants to collect only the documents promptly.

Further, in the copy process, when the number of documents placed on the document placement portion 11 exceeds the second reference value, the control portion 5 performs neither the copy process suspending process nor the determination result notifying process. Thus, in such a situation that the copy process continues for a long period of time because of a large number of documents and therefore the user is to be away from the apparatus for a while, it is possible to save the user from being burdened with unnecessary labor.

<Step S43>

In step S43, the control portion 5 controls the image forming portion 3 and the sheet conveying portion 4 to form images on the sheets on the basis of the image data rotated in step S42. The processes in step S41 and step S43 are an example of the first step in the present disclosure, and are executed by the process executing portion 55 of the control portion 5.

As described above, in the copy control process, when it is determined that documents having a sheet size smaller than or equal to the size of a sheet on which the image forming portion 3 can form an image, and having a width, in the document width direction 112B, larger than the width, in the sheet width direction 41B, in which the image forming portion 3 can form an image, are placed on the document placement portion 11, execution of the copy process is suspended and the determination results of the size and direction of the documents placed on the document placement portion 11 are notified. Thus, the user is urged to change the direction of the documents placed on the document placement portion 11. Therefore, it is possible to suppress delay of the start of image formation due to execution of the rotation process in the copy process.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
    a document conveying portion configured to convey documents placed on a document placement portion;
    an image reading portion configured to read image data from the documents conveyed by the document conveying portion;
    a sheet conveying portion configured to convey sheets;
    an image forming portion capable of forming images on the sheets conveyed by the sheet conveying portion on the basis of the image data, such that a width in which the image forming portion can form an image, in a sheet width direction perpendicular to a direction in which the sheets are conveyed by the sheet conveying portion, is smaller than a width in which the image reading portion can read an image, in a document width direction perpendicular to a direction in which the document conveying portion conveys the documents;
    a process executing portion configured to execute a copy process of copying the documents placed on the document placement portion, in accordance with an operation to execute the copy process;
    a size determining portion configured to determine a size and a direction of the documents placed on the document placement portion;
    a rotation process portion configured to rotate the image data of the documents to be read in the copy process, in a case where the size determining portion has determined that documents having a size smaller than or equal to a size of a sheet on which the image forming portion can form an image, and having a width, in the document width direction, larger than a width, in the sheet width direction, in which the image forming portion can form an image, are placed on the document placement portion; and
    a notification processing portion capable of suspending execution of the copy process by the process executing portion, and notifying a determination result of the size determining portion, in a case where an operation to execute the copy process has been performed and where the size determining portion has determined that documents having a size smaller than or equal to a size of a sheet on which the image forming portion can form an image, and having a width, in the document width direction, larger than a width, in the sheet width direction, in which the image forming portion can form an image, are placed on the document placement portion.

2. The image forming apparatus according to claim 1, wherein
    when the number of prints in the copy process exceeds a predetermined first reference value, the notification processing portion performs neither a process of suspending the copy process nor a process of notifying the determination result.

3. The image forming apparatus according to claim 1 further comprising a number-of-documents detecting portion configured to detect the number of the documents placed on the document placement portion, wherein
    when the number of the documents detected by the number-of-documents detecting portion exceeds a predetermined second reference value, the notification processing portion performs neither a process of suspending the copy process nor a process of notifying the determination result.

4. The image forming apparatus according to claim 1, wherein
    when an operation to execute the copy process is again performed after the notification of the determination result by the notification processing portion, the process executing portion executes the copy process.

5. The image forming apparatus according to claim 1, wherein
    the notification processing portion notifies, as well as the determination result, a message which urges a user to change the direction of the documents placed on the document placement portion.

6. The image forming apparatus according to claim 1, wherein
    the image reading portion is able to read image data from a document which is placed on the document placement portion and has a width, in the document width direction, smaller than or equal to a predetermined first width, and
    the image forming portion is able to form an image on a sheet having a width, in the sheet width direction, smaller than or equal to a second width smaller than the first width.

7. The image forming apparatus according to claim 6, wherein the first width is a width of an A4 size in a longitudinal direction thereof, and the second width is a width of the A4 size in a lateral direction thereof.

8. An image forming method executed in an image forming apparatus comprising: a document conveying portion configured to convey documents placed on a document placement portion; an image reading portion configured to read image data from the documents conveyed by the document conveying portion; a sheet conveying portion configured to convey sheets; and an image forming portion capable of forming images on the sheets conveyed by the sheet conveying portion on the basis of the image data, such that a width in which the image forming portion can form an image, in a sheet width direction perpendicular to a direction in which the sheets are conveyed by the sheet conveying portion, being smaller than a width in which the image reading portion can read an image, in a document width direction perpendicular to a direction in which the document conveying portion conveys the documents, and
    the method comprising:
    a first step of executing a copy process of copying the documents placed on the document placement portion, in accordance with an operation to execute the copy process;
    a second step of determining a size and a direction of the documents placed on the document placement portion;
    a third step of rotating the image data of the documents which are read in the copy process, in a case where it has been determined in the second step that documents having a size smaller than or equal to a size of a sheet on which the image forming portion can form an image, and having a width, in the document width direction, larger than a width, in the sheet width direction, in which the image forming portion can form an image, are placed on the document placement portion; and
    a fourth step of suspending execution of the copy process in the first step, and notifying a determination result obtained in the second step, in a case where an operation to execute the copy process has been performed and where it has been determined in the second step that documents having a size smaller than or equal to a size of a sheet on which the image forming portion can form an image, and having a width, in the document width direction, larger than a width, in the sheet width direction, in which the image forming portion can form an image, are placed on the document placement portion.

\* \* \* \* \*